United States Patent [19]

Craun

[11] Patent Number: 5,576,361
[45] Date of Patent: Nov. 19, 1996

[54] ZERO VOC, AQUEOUS DISPERSED, POLYESTER MODIFIED ACRYLIC-EPOXY MICROGEL POLYMERS

[75] Inventor: Gary P. Craun, Berea, Ohio

[73] Assignee: The Glidden Company, Cleveland, Ohio

[21] Appl. No.: 421,269

[22] Filed: Apr. 20, 1995

[51] Int. Cl.[6] .................................................. C08K 3/20
[52] U.S. Cl. .......................... 523/423; 523/400; 525/119; 525/438
[58] Field of Search .................................. 523/423, 400; 525/119, 438

[56] References Cited

U.S. PATENT DOCUMENTS 5,055,501 10/1991 Moriya et al. .......................... 523/423
5,290,828 3/1994 Craun et al. .

Primary Examiner—Melvyn I. Marquis
Assistant Examiner—D. Aylward
Attorney, Agent, or Firm—Thomas M. Schmitz

[57] ABSTRACT

Protective coating compositions free of volatile organic solvents and particularly useful as can coatings are produced based on an aqueous dispersed microgel polymeric binder comprising between about 1% and 70% low molecular weight polyester diluent, between about 1% and 70% epoxy resin, between about 10% and 80% addition copolymer, and between about 1% and 40% low molecular weight diepoxide crosslinking resin. The aqueous dispersed solvent free microgel polymer is produced by mixing the polyester diluent with high molecular weight epoxy to produce a fluid resin mixture, copolymerizing in-situ ethylenically unsature monomers including carboxyl monomers in the presence of the fluid resin mixture and dispersing the resulting polymeric mixture into water. Low molecular weight diepoxide resin is added and crosslinked with carboxyl functionality to produce the microgel polymers.

14 Claims, No Drawings

ZERO VOC, AQUEOUS DISPERSED, POLYESTER MODIFIED ACRYLIC-EPOXY MICROGEL POLYMERS

This invention pertains to zero VOC, aqueous dispersed, polyester and acrylic modified epoxy crosslinked microgel polymeric binders useful in protective surface comings applied to a substrate and particularly to zero VOC coatings applied to interior surfaces of can containers for beverages and foods.

BACKGROUND OF THE INVENTION

Industrial coatings are surface protective coatings (paint coatings) applied to substrates and typically heat cured to form continuous films for decorative purposes as well as to protect the substrate. A protective coating ordinarily comprises an organic polymeric binder, pigments, and various paint additives, where the polymeric binder acts as a fluid vehicle for the pigments and imparts rheological properties to the fluid paint coating. Upon curing, the polymeric binder hardens and functions as a binder for the pigments and provides adhesion of the dried paint film to the substrate. The pigments may be organic or inorganic and functionally contribute to opacity and color in addition to durability and hardness, although some paint coatings contain little or no opacifying pigments and are described as clear coatings. The manufacture of paint coatings involves the preparation of a polymeric binder, mixing of component materials, grinding of pigments in the polymeric binder, and thinning to commercial standards.

Epoxy resins are particularly desirable for use in protective surface coating materials as a vehicle or polymeric binder for pigments, fillers, and other additives where the epoxy resins advantageously provide toughness, flexibility, adhesion, and chemical resistance. Water-dispersed coating compositions containing epoxy resins are highly desirable for can coating compositions and particularly useful for interior surfaces. Coatings for soft drink and beer cans, for instance, are critical due to taste sensitivity wherein can coatings must not alter the product taste of canned beverages. Taste problems can occur in a variety of ways such as by leaching of coating components into the beverage, or by absorption of flavor by the coating, or sometimes by chemical reaction, or by some combination thereof.

Container coating technology frequently utilizes an epoxy resin which has been grafted with acrylic monomers, styrene, and methacrylic acid. This grafted epoxy resin is prepared in solvent, usually butyl cellosolve, and n-butanol, to maintain low processing viscosities and then reduced with water by a direct or inverse let down procedure. Although cured film properties are highly desirable, such coatings suffer from the fact that sizeable amounts of organic solvent are required to obtain good performance. High molecular weight epoxy resins typically require 50% to 90% solvent (based on total solids plus organic solvent) before reducing with amine and water. Epoxy based can coatings comprising a carbon grated acrylic chain produced in the presence of an extender resin are disclosed in U.S. Pat. No. 4,399,241 and U.S. Pat. No. 4,482,671 while U.S. Pat. No. 4,595,716, and U.S. Pat. No. 5,157,078 teach a carbon grafting process involving solvent polymerization at moderate temperatures with high levels of peroxide initiator to produce a carbon-graft polymer. The high solvent levels, however, invariably carry over to the aqueous dispersion when the resulting polymers are dispersed into water to produce a VOC (volatile organic compounds) level considerably above 2 and typically between 3 and 4 pounds volatile organic compounds per gallon of resin solids.

Commonly assigned U.S. Pat. No. 5,290,828 discloses an acrylic grafted epoxy polyester terpolymer produced by in-situ copolymerization of ethylenic monomers with low molecular weight epoxy and unsaturated polyester resins where carboxyl monomers esterify epoxy groups while monomer double bonds coreact with polyester double bonds to form the terpolymer and subsequently dispersed into water. Commonly assigned Ser. No. 222,029 filed Apr. 4, 1994 U.S. Pat. No. 5,464,885 discloses an acrylic grafted epoxy-ester produced by first esterifying epoxy resin with a carboxyl functional unsaturated polyester to form an unsaturated epoxy-ester. The unsaturated epoxy-ester is dispersed into water and followed by in-situ copolymerization of ethylenic monomers in the aqueous dispersion, where the copolymerized monomers partially graft to the preformed unsaturated epoxy ester. Commonly assigned U.S. Ser. No. 274,804 filed Jul. 14, 1994 discloses a carboxyl functional acrylic copolymer dispersed into water to provide a polymeric dispersant and enable subsequent aqueous dispersement of a high molecular weight carboxyl functional polyester into water. The aqueous dispersion of acrylic copolymer and polyester are subsequently crosslinked with a dispersed diepoxide resin to produce microgel emulsion particles. Coating compositions utilizing microgels are shown in U.S. Pat. No. 4,897,434 where epoxy is first reacted with a carboxyl addition polymer in the absence of water to form a non-aqueous epoxy ester, then dispersed into water, followed by self-crosslinking between epoxy groups and carboxyl groups in the preformed epoxy ester.

It now has been found that epoxy based coating compositions exhibiting excellent film resistance properties can be successfully prepared without the use of organic solvent during synthesis of the polymeric binder for the coating. In particular, it has been found that low molecular weight, low viscosity linear polyesters can be mixed with and used as a diluent for high molecular weight epoxy resins to provide a fluid medium for in-situ copolymerization of ethylenic monomers including carboxyl monomers in the presence of the polyester diluent and the high molecular weight epoxy to produce an addition copolymer, preferably carbon grafted to the epoxy, and the polyester diluent. The resulting mixture is subsequently dispersed into water assisted by a volatile base to produce a water dispersed polymeric composition of polyester, epoxy, and addition copolymer. After dispersion into water, low molecular weight liquid diepoxide resin is added to the water dispersed polymers and then coreacted with carboxyl functionality on the addition copolymer to produce aqueous dispersed crosslinked microgel polymer particles. Coating compositions containing the microgel crosslinked polymer as the polymeric binder can be heat cured to provide excellent clear, smooth and glossy paint films without organic volatile emissions. Boiling water resistance of the cured film is excellent while damage resistance is improved due to modifying characteristics of the polyester diluent. Plasticizing effects imparted by the low molecular weight polyester diluent further reduces or eliminates the need for the inclusion of low Tg ethylenically unsaturated monomers in the addition copolymer. These and other advantages of the invention will become more apparent by referring to the detailed description of the invention and the illustrative examples.

SUMMARY OF THE INVENTION

Briefly, the invention pertains to a protective coating composition containing a polymeric binder comprising 1% to 70% polyester, 1% to 70% epoxy, 10% to 80% addition copolymer, and 1% to 40% low molecular weight diepoxide resin coreacted with the addition copolymer to provide a water dispersed microgel crosslinked polymer. In accordance with the process of this invention, low molecular weight polyester diluent and high molecular weight epoxy are mixed together and heated in the absence of water to form a fluid mixture. Ethlenic monomers are then copolymerized in-situ with the polyester and high molecular weight epoxy in non-aqueous polymerization to form a three polymer composition, which is then dispersed into water followed by the addition of low molecular weight diepoxide to the aqueous dispersion. The diepoxide is crosslinked with carboxyl functionality in the addition copolymer to form water dispersed crosslinked microgel polymers.

DETAILED DESCRIPTION OF THE INVENTION

The invention comprises aqueous dispersed, crosslinked, microgel polymers comprising low molecular weight liquid polyester diluent, high molecular weight epoxy resin, addition copolymer of copolymerized monomers, and low molecular weight diepoxide crosslinking resin.

Referring first to the polyester diluent, useful polyesters generally comprise esterification products of dicarboxylic acids with diols to produce essentially linear polyester polymers although minor amounts of branching due to tri-functional components is acceptable. Suitable linear saturated dicarboxylic acids have between 2 and 10 linear carbon atoms such as adipic, azelaic, succinic, glutaric, pimelic, subercic or sebacic acid to produce low molecular weight polyesters. Aromatic dicarboxylic acids (anhydrides) include phthalic, isophthalic, terephthalic, and tetrahydrophthalic. Suitable glycols include linear aliphatic glycols having 2 to 8 carbon atoms such as ethylene glycol, 1,3 or 1,4 butylamine glycol, 1,6 hexane diol, neopentyl glycol, propylene glycol, diethylene or dipropylene glycols, triethylene glycol and similar linear glycols. Very minor amounts of triols such as trimethoylol propane, and trimethylol ethane, and other polyols such as pentaerythritol can be included if desired. Particularly useful polyesters can be prepared from any of the common dicarboxylic acids, such as adipic acid, isophthalic acid, phthalic acid, dodecanedioic acid, sebacic acid and the like, with lesser amounts of monobasic acids if desired, such as benzoic acid, and 2-ethylhexanoic acid. Unsaturated diacids preferably are not used. Useful polyesters can be prepared at about 500 to 10,000 Mn, number average molecular weights, where 800 to 3,000 Mn is preferred. Suitable polyester diluents have low melt viscosities less than 50 poise and preferably less than about 20 poise at 150° C. as measured by ICI cone-and-plate. Useful polyester diluents have a very low Acid No. below 40 and preferably between 0 to 15 milligrams KOH per gram of polymer. Monoacids such as benzoic acids, 2-ethylhexanoic acid, lauric acid, and similar lower fatty acids may be added as required to control the molecular weight and reduced the free glycol levels. Polyester diluents are prepared with an equivalent excess of hydroxyl groups with lesser equivalents of carboxylic acid although this may be minimized depending on equivalents of mono-acid utilized. Similarly, monoalcohols can be used to cap carboxyl groups. On a weight basis, between about 1% and 70% polyester diluent is used based on the microgel polymeric composition. The polyester diluent is synthesized in the normal manner, preferably in the absence of organic solvent, at esterification temperatures of about 150° C. to 250° C. to completion and to a very low Acid No approaching zero.

Referring next to the epoxy resin, useful epoxy resins are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-S, and 4,4 dihydroxy bisphenol, with the most preferred being bisphenol-A. Halohydrins include epichlorohydrin, dichlorohydrin, and 1,2-dichloro-3-hydroxypropane with the most preferred being epichlorohydrin. Preferred epoxy resins comprise the coreaction product of excess molar equivalents of epichlorohydrin with bisphenol-A to produce predominantly an epoxy group terminated linear molecular chain of repeating units of diglycidyl ether of bisphenol-A containing between 2 and 25 repeating copolymerized units of diglcidyl ether of bisphenol-A. In practice, excess molar equivalents of epichlorohydrin are reacted with bisphenol-A to produce diepoxide epoxy resins where up to two moles of epichlorohydrin coreact with one mole of bisphenolA, although less than complete reaction can produce difunctional epoxy resin along with some monoepoxide chains terminated at one end with a bisphenol-A unit. The preferred linear epoxy resins are polyglycidyl ethers of bisphenol-A having terminating 1,2-epoxide groups (oxirane groups) and an epoxy equivalent weight between 700 and 6000, and a number average molecular weight between 1,500 and 15,000 as measured by gel permeation chromatography (GPC). Commercially available and useful high molecular weight epoxy resins include all of the commercial higher molecular weight resins such as EPON 1009, 1007, 1004, and the like, as well as resins which are prepared by the advancement of excess equivalents of liquid epoxy resins with lesser equivalents of bisphenol A to produce predominantly oxirane group terminated epoxy resins. Although not as common, trifunctional epoxy resins are useful comprising branched chain epoxy resins where the branched chains as well as the backbone chain are each terminated with a terminal epoxide group to provide greater than two epoxide functionality. Trifunctional epoxy resins can be produced by coreacting epichlorohydrin with polynuclear polyhydroxy phenols, trifunctional phenols, or aliphatic tri-functional alcohols. Levels of use of the epoxy resins are between about 1% and 70% and preferably between 5% and 30% by weight of the microgel polymeric composition. The epoxy resin is mixed with the low viscosity polyester diluent to provide a polymerization medium for in-situ copolymerization of ethytenically unsaturated monomers. Useful ethylenic monomers contain carbon-to-carbon unsaturation and include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters; vinyl halides include vinyl chloride, vinyl fluoride, and vinylidene chloride; vinyl aromatic hydrocarbons include styrene, methyl styrenes and similar lower alkyl styrenes, cholorostyrene, vinyl toluene and vinyl naphthalene; vinyl aliphatic hydrocarbon monomers include alpha olefins such as ethylene, propylene and isobutylene; and vinyl alkyl ethers include mehtyl vinyl ether, isopropyl vinyl ether, n-butyl vinyl either, and isobutyl vinyl ether. Useful acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Acrylic acids include acrylic and methacrylic acid, ethacrylic acid, alpha-chloroacrylic acid, alpha-cyanoacrylic acid, crotonic acid, beta-acryloxy propionic acid, and beta-styrl acrylic acid. Carboxyl containing monomers comprise between 5% and 99% of the ethylenically unsaturated monomers. Carboxy containing monomers include acrylic acid and lower alkyl substituted acrylic acids wherein the preferred carboxylic monomers are acrylic and methacrylic acids. The copolymerized ethylenic monomers produce an in-situ formed addition copolymer with the polyester diluent and high molecular weight epoxy resin. The preferred addition copolymer comprises an acrylic copolymer containing between 1% and 99% by weight copolymerized acrylic monomer. The addition copolymer comprises between 10% and 80% by weight of the microgel polymer.

The in-situ formed addition copolymer is sufficiently carboxyl functional to enable the in-situ formed polymeric mixture to be dispersed into water. The ethylenic monomers copolymerized in-situ are activated with a suitable free radical initiator at levels of about 1% to 10% based on the weight of ethylenic monomers copolymerized. Suitable initiators are peroxide initiators such as benzoyl peroxide, t-butyl perbenzoate, dicumyl peroxide, hydroperoxide, t-butyl peroxide, laurel peroxide, methyl ethyl ketone peroxide and similar peroxide initiators. T-butyl perbenzoate is preferred. The initiator is mixed with ethylenically monomers which can be added to the polyester diluent and high molecular weight epoxy resin mixture an in-situ polymerized over a period of time typically between 0.5 and 4 hours. The reaction temperature typically can between 100° C. and 180° C. and preferably between 110° C. and 160° C. The resulting in-situ formed blend of polyester diluent, high molecular weight epoxy resin, and addition copolymer can be dispersed into water by adding a base to the resin mixture and dispersing into water or pouring the heated resin into water containing the base component. Suitable base dispersing components include tertiary amines, ammonium hydroxide, or ammonia. To reduce volatiles (VOC), ammonia is the preferred base dispersing agent for dispersing the carboxyl functional resin mixture. Direct or reverse let down procedures can be used for inversion of the addition copolymer into water. Ammonia is generally used as the inverting base, because ammonia gives no added VOC. Common amines, such as dimethylethanol amine, triethyl amine, and the like can be used, alone or in combination with ammonia. The addition copolymer is best inverted hot, at it synthesis temperature, as viscosity rises at lower temperatures to the point where inversion into water is difficult. Only low to moderate shear is required for the inversion of the resin mixture. The resulting water dispersed mixture is then converted to a water dispersed microgel in accordance with the invention.

Low molecular weight diepoxide crosslinking resin is added to the water dispersed carboxyl functional resin mixture of polyester diluent, high molecular weight epoxy resin, and carboxyl functional addition copolymer to convert the resin mixture to a water dispersed microgel. Useful low molecular weight diepoxide resins for crosslinking the carboxyl copolymers are predominantly linear chain oxrane functional molecules comprising the coreaction product of polynuclear dihydroxy phenols or bisphenols with halohydrins to produce epoxy resins containing preferably two epoxy groups per molecule. The most common bisphenols are bisphenol-A, bisphenol-F, bisphenol-S, and 4,4 dihydroxy bisphenol, with the most preferred being bisphenol-A. Halohydrins include epichlorohydrin, dichlorohydrin, and 1,2-dichloro-3-hydroxypropane with the most preferred being epichlorohydrin. Preferred diepoxide resins comprise the coreaction product of excess molar equivalents of epichlorohydrin with bisphenol-A to produce predominantly an epoxy group terminated linear molecular chain of repeating units of diglycidyl ether of bisphenol-A containing between 1 and 5 repeating copolymerized units of diglycidyl ether of bisphenol-A. In practice, an excess of molar equivalent of epichlorohydrin are reacted with bisphenol-A to produce diepoxide epoxy resins where up to two moles of epichlorohydrin coreact with one mole of bisphenol-A, although less than complete reaction can produce difunctional epoxy resin along with some monoepoxide chains terminated at the other end with a bisphenol-A unit. The preferred linear epoxy resins are polyglycidyl ethers of bisphenol-A having terminating 1,2-epoxide groups (oxirane groups) and a number average molecular weight between 200 and 10,000 and preferably from about 360 to 1,000 as measured by gel permeation chromatography (GPC). Commercially available lower molecular weight epoxy resins include Dow Chemical epoxy resins identified by trade number and average molecular weights as follows: DER 333 (380); DER 661 (1050); while Shell Chemical epoxy resins are EPON 828 (380); EPON 836 (625); and EPON 1001 (1050). Preferred epoxy equivalent weight epoxy resins have an equivalent weight between 100 and 500, and preferably between 180 and 500. Low molecular weight diepoxide crosslinking resins further include nonaqueous alkylene oxide resins which are epoxide functional resins comprising an alkylene oxide adduct of a bisphenol compound. The alkylene oxide is an aliphatic alkyl derivative having up to about 26 carbon atoms although preferred oxides are lower alkyl oxides such as ethylene, propylene, and butylene oxides. Bisphenol compounds include bisphenol-A, bisphenol-F and bissulfone or sulfides. Typically two or more moles of alkyl oxide are coreacted with one mole of bisphenol compound. Preferred compositions are 2:1 molar reactions while a suitable number average molecular weight range of alkylene oxide resins is between 200 and 1,000 as measured by GPC. Other suitable diepoxide functional resins include low molecular weight polyepoxides such as epoxidized sorbitol and epoxy novalacs. On a weight basis, the low molecular weight diepoxide crosslinking resin comprises between 1% and 40% by weight of the resulting crosslinked microgel polymer particles.

The liquid low molecular weight diepoxide crosslinking resin, such as DER333 or EPON828, can be blended with the resin mixture of polyester diluent, high molecular weight epoxy and in-situ formed addition copolymer either before or after the resin mixture is dispersed into water. The preferred method is to add the diepoxide after the resin mixture is dispersed into water to avoid possible premature reaction and gelation. After dispersing the diepoxide into the water dispersed resin mixture, heat preferably is applied to increase the diepoxide crosslinking reaction with carboxyl groups in the aqueous dispersed resin mixture.

Catalysts such as tertiary amines, phosphines, pyridine, and the like can be added at low levels (0.1 to 1%) to further increase the acid-epoxy reaction rate. The crosslinking reaction between diepoxide and carboxyl groups advantageously can be carried out at about 90° C. Alternatively, the carboxylic acid epoxy reaction can occur at room temperature over a longer period of time, although this is not the preferred method. Viscosity generally rises as this carboxyl epoxy reaction occurs. The resulting epoxy crosslinked copolymers comprise art aqueous micro-dispersion of very small crosslinked polymer particles having an average microgel particle size below 2 microns, advantageously less than 0.5 microns, desirably between 0.02 and 0.2 micron, and preferably between 0.02 and 0.1 micron size microgel particles. The carboxyl functional copolymer crosslinks with diepoxide epoxy resin to provide microgel polymer particles having an Acid No. above 30 desirably between 40 and 200 and preferably between 60 and 150. The aqueous dispersed acrylic-epoxy crosslinked microgel particles provide excellent film forming properties.

On a weight basis, the aqueous dispersed crosslinked microgel polymer particles comprise between 1% and 70% polyester diluent, between 1% and 70% epoxy resin, between 10% and 80% addition copolymer of copolymerized ethylenic monomer, and between 1% and 40% low molecular weight diepoxide crosslinking resin. Preferred microgel polymers comprise 10% to 40% polyester diluent, 5% to 30% epoxy resin, 20% to 60% addition copolymer, and 5% to 20% diepoxide resin.

The microgel dispersions have particle sizes under 2 microns and can be used as polymeric binders in coatings for containers. The resulting epoxy crosslinked microgel copolymers comprise aqueous micro-dispersion having very small cross linked microgel polymer particles desirably below 1 micron and preferably between 0.02 and 0.1 microns. The microgel particles produced crosslinking by difunctional low molecular weight epoxy surprisingly provides crosslinked copolymers in the form of a stable aqueous microdispersion of extraordinary small internally crosslinked microgel polymer particles without the need for external surfactants. Excellent protective film formations on substrates are achieved without surfactants even though the microgel particles are internally highly crosslinked. Conventional external crosslinking agents such as melamine are not required.

In accordance with the process of this invention, the polyester diluent and high molecular weight epoxy resin are mixed, preferably without organic solvent, to form a fluid resin mixture where moderate heat is applied as necessary. The ethylenic monomer including carboxyl monomers are then copolymerized in-situ in the fluid resin mixture to produce an in-situ formed modified resin mixture. The in-situ formed modified resin can then dispersed into water and crosslinked by the diepoxide while applying heat as desired.

Accordingly, high quality coatings for interior beverage cans can be produced with diepoxide crosslinked microgel polymeric particles. Aqueous dispersions of these blended resins can be prepared in water with ammonia neutralization without use of volatile solvent and at zero VOC levels. Cured films exhibit excellent water resistance, and good clarity and gloss along with excellent boiling water resistance and resilient damage resistance.

The merits of this invention are further illustrated by the following illustrative examples. Molecular weights are number average molecular weights measured by gel permeation chromatograph (GPC).

EXAMPLE 1

Polyester synthesis:

548 g adipic acid 208 g isophthalic acid 584 g diethylene glygol 0.3 g butylstanoic acid Heat the above under nitrogen to 230° C. over 3 hours. Use a glass bead packed column and maintain head temperature below 100° C. After head temperature drops below 60° C., remove column and use xylene azeotrophe with a Dean Stark trap to acid number 12 mg KOH/g resin. Strip off xylene with 25 inches of vacuum. Cool.

EXAMPLE 2

Preparation of aqueous dispersion a) 150 g polyester from Example 1

25 g Epon 1009 b) 15 g t-butyl perbenzoate 90 g methacrylic acid 80 g styrene 80 g ethyl acrylate c) 400 g water 7.5 g dimethylethanol amine 46 g ammonium hydroxide, 28% $NH_3$ d) 1102 g water Heat a) to 150° C. under nitrogen. Add b) over 2.5 hours, and hold ½ hour. Add c) over 10 minutes from a dropping funnel, slowly, and then gradually more rapidly as batch temperature drops below 100° C. Add d). Add 35 g DER 333 to 900 g of this aqueous inversion, and hold at 90° C. for 2 hours.

EXAMPLE 3

Prepare as in Example 2, but add DER 333 to the whole batch:

a) 75 g polyester i from Example 1

5.0 g Epon 1009 b) 8.0 g t-butyl perbenzoate 45 g methacrylic acid 48 g styrene 40 g ethyl acrylate c) 200 g water 4.0 g dimethylethanol amine 23 g ammonium hydroxide, 28% $NH_3$ d) 673 g water e) 39 g DER 333

RESULTS

Draw down films of Example 2 and Example 3 resins were applied over aluminum panels with a #18 wire wound bar. The films were baked for 2 minutes at 200° C. Both panels were clear, glossy, and smooth. No blush was noted after 5 minute in boiling deionized water.

I claim:

1. An aqueous dispersed protective coating composition substantially free of volatile organic solvents and containing an aqueous dispersed microgel polymeric binder, the microgel polymeric binder comprising on a weight basis:

between 1% and 70% polyester diluent having a number average molecular weight between about 300 and 10,000 and a melt viscosity below about 50 poise at 150° C. and an Acid No. below about 40;

between 1% and 70% epoxy resin having a number average molecular weight between about 1,500 and 15,000;

between 10% and 80% carboxyl functional, in-situ formed addition copolymer of copolymerized ethylenically unsaturated monomers including at least 5% carboxyl monomer based on the weight of the ethylenic monomers copolymerized; and between 1% and 40% low molecular weight diepoxide crosslinking resin having an epoxy equivalent weight between about 100 and 500;

where the microgel polymer is produced by the process steps of a) the polyester diluent being mixed with the high molecular weight epoxy resin in the absence of water to form a fluid resin mixture, b) copolymerizing the ethylenically unsaturated monomers in the presence of the fluid resin mixture to produce an in-situ formed non-aqueous resin mixture of addition copolymer dispersant in polyester diluent arid epoxy resin; c) dispersing the in-situ formed resin mixture into water while adding the diepoxide crosslinking resin with the in-situ modified resin mixture or after the in-situ modified resin mixture is dispersed into water; and d) crosslinking the carboxyl functional addition polymer with the diepoxide resin to produce stable, aqueous dispersed, microgel polymer particles having a particle size less than 2 microns an Acid No. above 30.

2. The aqueous dispersed coating composition of claim 1 where the polyester diluent comprises between 10% and 40% by weight of the microgel polymer.

3. The aqueous dispersed coating composition of claim 1 where the polyester diluent has a number average molecular weight between 500 and 3,000.

4. The aqueous dispersed coating composition of claim 1 where the polyester diluent has an Acid No. between 0 and 15.

5. The coating composition of claim 1 where the microgel polymer particle size is between 0.02 and 0.5 microns.

6. The coating composition of claim 1 where the microgel polymer particle size is between 0.02 and 0.2 microns.

7. The coating composition of claim 1 where the microgel polymer particle size is between 0.02 and 0.1 microns.

8. The coating composition of claim 1 where the microgel polymer has an Acid No. between 40 and 200;

9. The coating composition of claim 1 where the microgel polymer composition comprises 10% to 40% polyester diluent, 5% to 30% epoxy resin, 20% to 60% addition copolymer, and 5% to 20% diepoxide crosslinking resin.

10. A process for producing an aqueous dispersed protective composition containing a polymeric binder of microgel polymer particles stably dispersed into water, the process steps comprising mixing a polyester diluent and an epoxy resin together in the absence of water to provide a resin polymerization medium, where the polyester diluent has a number average molecular weight between 300 and 10,000 and a melt viscosity below 50 poise at 150° C. and an Acid No. below 40, and the epoxy resin has a number average molecular weight between about 1,500 and 15,000;

copolymerizing ethylenically unsaturated monomers, including at least 5% by weight carboxyl ethylenic monomers based on the weight of the monomers copolymerized, in the polyester diluent and epoxy resin polymerization medium, to produce an in-situ formed non-aqueous resin mixture of carboxyl functional addition copolymer dispersant in the polyester diluent and epoxy resin;

dispersing the in-situ formed resin mixture into water;

adding diepoxide crosslinking resin with the in-situ formed resin mixture where the diepoxide crosslinking resin has an epoxy equivalent weight between 100 and 500; and crosslinking the diepoxide crosslinking resin with the carboxyl functional addition copolymer to produce an aqueous dispersed microgel polymer particle composition by weight of 1% to 70% polyester diluent, 1% to 70% epoxy resin, 10% to 80% carboxyl functional copolymer, and 1% to 40% low molecular weight diepoxide crosslinking resin, a particle size less than 2 microns, and an Acid No. above 30.

11. The process according to claim 10 where the ethylenically unsaturated monomers copolymerized comprise between 5% and 99% of the ethylenically unsaturated monomers copolymerized.

12. The process of claim 10 where the diepoxide crosslinking resin is added to the water dispersed in-situ formed resin mixture.

13. The process of claim 10 where the diepoxide crosslinking resin is added with the in-situ formed resin mixture prior to dispersing into water.

14. The process of claim 10 where heat is applied to crosslink the diepoxide crosslinking resin with the carboxyl functional addition copolymer.

\* \* \* \* \*